United States Patent [19]
Burley

[11] 3,817,048
[45] June 18, 1974

[54] DEWATERING SLUDGES

[75] Inventor: Michael John Burley, Tetsworth, England

[73] Assignee: The Water Research Association, London, England

[22] Filed: July 7, 1972

[21] Appl. No.: 269,593

[30] Foreign Application Priority Data
July 13, 1971   Great Britain.................. 32725/71

[52] U.S. Cl............................. 62/64, 62/58, 62/123, 210/71
[51] Int. Cl................................................ F25d 17/02
[58] Field of Search ............... 62/58, 64, 123, 124; 210/71

[56] References Cited
UNITED STATES PATENTS
2,703,782   3/1955   Regan et al...................... 210/71 X 3,180,102   4/1973   Torobin et al.................... 62/123 X FOREIGN PATENTS OR APPLICATIONS
1,097,583   1/1968   Great Britain....................... 62/64

Primary Examiner—Meyer Perlin
Assistant Examiner—Ronald C. Capossela
Attorney, Agent, or Firm—Bacon & Thomas

[57] ABSTRACT

Reduction of the liquid content of a sludge is facilitated by first freezing the sludge in droplet form by contacting the droplets with an inert liquid refrigerant which is immiscible with the suspending medium of the sludge, and then thawing the frozen droplets. Advantageously, the refrigerant is a liquefied gas and the latent heat of freezing is absorbed as heat of evaporation, the evaporated gas subsequently being used to thaw the frozen droplets. The process is particularly useful for water treatment sludges.

11 Claims, 1 Drawing Figure

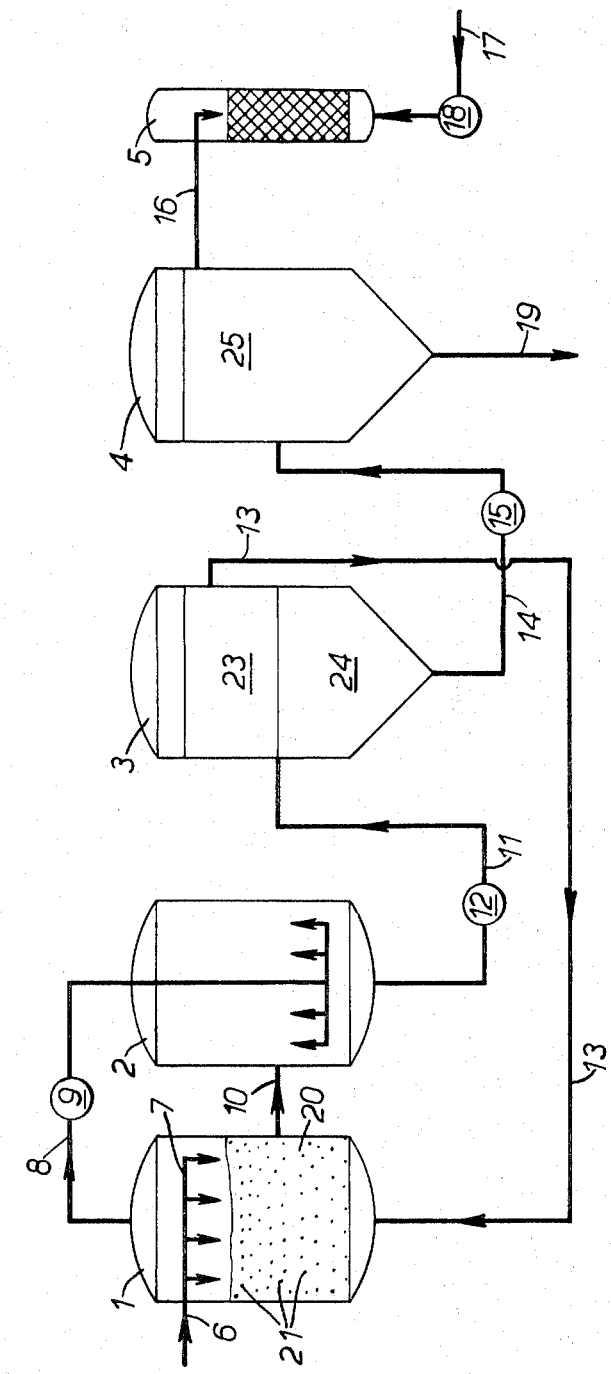

DEWATERING SLUDGES

This invention is concerned with reducing the liquid content of sludges, and particularly, but not exclusively, with dewatering aqueous sludges.

Many water-treatment and sewage-treatment processes produce aqueous sludges as unwanted by-products. These sludges, which will often contain from 80 up to almost 100 percent by weight water, are difficult to dispose of and, accordingly, various attempts have been made to dewater them (that is to reduce their water content) since dewatered sludges are much more readily handled and disposed of. For example, when an aluminium sulphate coagulant sludge is dewatered to about 75 percent by weight water, it can readily be handled and disposed of, for example by dumping on land as a solid material. Similarly, softening sludges can be readily handled and disposed of at water contents of about 35 percent.

Whilst sludges are, in general, difficult to dewater, it has been found that they can be more easily dewatered if they are first frozen and subsequently thawed. The reasons for this are not fully understood but it is believed that during the freezing step, bonds between the liquid and solid of the sludge are broken, and these bonds are not re-formed on thawing.

One method of freezing the sludge which has been tried comprises placing it in a vessel containing a number of spaced tubes through which refrigerant liquid is circulated. When the sludge is fully frozen, warm fluid is passed through the tubes to thaw the sludge. This technique suffers from several serious practical difficulties, including severe wear on the vessel due to expansion of the sludge upon freezing. Also, the energy consumption in freezing and thawing the sludge is high and the process is overall barely economic.

We have now developed a method of reducing the liquid content of sludges in which the sludge is first frozen and then thawed, which method can be relatively easily and economically carried out.

The invention provides a method of reducing the liquid content of a sludge which comprises freezing the sludge by contacting it, in droplet form, with an inert liquid which is at a temperature below the freezing temperature of the suspending medium of the sludge and which is immiscible with the said medium, thawing the frozen droplets and then reducing the liquid content of the sludge.

The invention also provides apparatus for carrying out the method of the invention which comprises a vessel for containing an inert liquid, means for providing in said liquid, in use of the apparatus, droplets of sludge whereby the droplets are frozen by contact with the liquid, means for supplying heat to thaw said frozen droplets, means for separating the droplets from said inert liquid and means for reducing the liquid content of the thawed droplets.

There are many suitable inert liquids which can be used, including most of the common water-immiscible inert organic solvents. Examples include carbon tetrachloride, hexane and toluene. When liquids such as these are used, suitable refrigeration apparatus will generally be required to maintain them at the desired low temperature.

We prefer, however, instead of using cooled liquids of this type, to use liquefied gases which boil at a temperature below that of the suspending medium of the sludge at a pressure reasonably close to atmospheric, say from 10 to 30 psia. In use, the liquefied gas is maintained at a pressure at which it boils, in the case of aqueous sludges, for example, below 32°F. and the sludge droplets are contacted with the boiling or near-boiling liquid. The latent heat of freezing the sludge droplets is absorbed as latent heat of evaporation of the liquid. The gas evolved will preferably be subsequently re-liquefied (as described hereinafter). Suitable liquefied gases include, for example, n- and iso-butane, propane, butene, and mixtures of hydrocarbons.

The use of liquefied gases to freeze the sludge droplets has several advantages including ease of handling the liquids and gases, economic advantages and the possibility of using the gas subsequently in thawing the frozen sludge droplets. This will be described hereinafter.

In the method of the invention, the sludge is dispersed in droplet form in the cooling liquid. This may be effected in several ways, one of the most convenient being to spray the sludge into a bath or vessel containing the liquid. The sludge may be sprayed from one or more nozzles immersed in the liquid or, more preferably, disposed in the vapour space above the liquid surface, or disposed in a wall of the vessel containing the liquid, for example. Another possibility is to pump the sludge into the vapour space of the freezer vessel as a continuous stream so that it impinges upon a splash plate thereby producing droplets.

Because the sludge is in droplet form, each droplet is very quickly frozen throughout and the droplets need only remain in the liquid a short time. It is generally preferred that the sludge droplets be small rather than large since the smaller the size, the more quickly are they frozen.

It is possible so to arrange conditions that a fluidised bed of the droplets in the coolant liquid is obtained. It is, of course, a well-known characteristic of fluidised beds that very efficient heat transfer is obtained therein and this is advantageous in the method of the invention in that the sludge droplets are very quickly frozen.

In order to achieve rapid freezing it may be advantageous to agitate the cooling liquid by mechanical means, for example, stirring or pumping or preferably by injecting a portion of the vapour released, after compression, into the cooling liquid.

When the sludge droplets have been frozen, they may be separated from the cooling liquid before they are thawed. This separation step is not essential but is preferred when energy consumption is to be kept to a minimum. The forzen droplets can be separated by filtration or sedimentation, for example, or by any other suitable technique.

The frozen droplets (either separated from, or in admixture with, the liquefied gas) are then thawed. This can be effected (at most times of the year) simply by exposing them to the ordinary atmospheric temperature but generally thawing by this process is slow and, where large volumes of sludge are involved, uneconomical. Accordingly, it is generally preferred to apply heat to the frozen droplets. This can be effected in many different ways, as will be clear to those skilled in the art.

A preferred method of thawing the droplets in the method of the invention involves contacting them with the gas discharged from the freezer, the gas having first been compressed (or otherwise heated) to raise its temperature above 32°F. (or the melting temperature of the droplets). In the case where the frozen droplets have not been separated from the liquefied gas coolant, the droplets may be melted by passing the compressed gas into the slurry of frozen droplets in liquefied gas. Where the frozen droplets have first been separated, the compressed gas may be passed through a bed of the frozen droplets. The operating conditions and the temperature of the droplets is such that the gas condenses to a liquid on the droplets or in the slurry, and the droplets melt.

The resulting mixture of water (or suspending medium), solids and liquefied gas can be treated in a number of ways to separate the liquefied gas and the solids. For example, solids can be separated by sedimentation or filtration (to form a dewatered sludge). The liquefied gas can be separated from the water (or suspending medium) in several ways including, for example, decanting or by use of a separation tank, and the last traces of liquefied gas can be removed from the suspending medium if desired by vacuum stripping, stripping with an inert gas (such as nitrogen) or by carbon adsorption, for example.

The gas or liquefied gas separated can, of course, be recycled for further use in the freezing step or in the thawing step.

Typical of the sludges which can be dewatered by the method of the present invention are coagulant and softening sludges produced in water treatment. It should be understood, however, that the invention is not limited to the treatment of aqueous sludges. Non-aqueous chemical sludges may also be treated, provided of course that the coolant liquid is inert to, and immiscible with, the suspending medium of the sludge.

The method of the invention may be carried out batch-wise or continuously. One suitable form of apparatus for continuous operation is illustrated schematically (and merely by way of example) in the accompanying drawing. Referring to the drawing, the apparatus comprises a freezer 1, a melter 2, a decanter 3, a sedimentation tank 4 and a stripper 5. A sludge supply line 6 enters a wall of freezer 1 and connects with a spray device 7. A gas exit line 8 connects the top of freezer 1, via a compressor 9, to the inside of melter 2. Conduit 10 connects the lower part of freezer 1 with melter 2. Line 11 connects the bottom of melter 2 with decanter 3 via a pump 12. The upper portion of decanter 3 is connected to the bottom of freezer 1 by line 13. The bottom of decanter 3 connects via line 14 and pump 15 with sedimentation tank 4, the upper portion of which is connected to stripper 5 via line 16. The bottom of the sedimentation tank 4 is provided with a solids discharge line 19. The bottom of stripper 5 is connected to gas supply line 17 via pump 18. The top of stripper 5 is vented to the atmosphere.

In operation, sludge is sprayed (via line 6 and spray 7) into liquefied gas 20 in freezer 1. The gas is at a pressure at which it boils below 32°F. The sludge droplets 21 freeze solid throughout their thickness and a slurry of the frozen droplets in the liquefied gas coolant is withdrawn via line 10 from whence it enters melter 2. The gas evolved in freezer 1 passes through line 8 and is compressed (to raise its temperature above 32°F. in compressor 9. The warmed gas is then passed into the slurry in melter 2. The frozen droplets melt and the warm gas is cooled and condenses to a liquid. Any gas which does not condense may be recirculated through the melter or it may be re-liquefied and recirculated to freezer 1.

The mixture of liquefied gas, water and sludge solids formed in the melter is pumped via line 11 to the decanter 3 where the liquefied gas, being immiscible with the water, separates therefrom into an upper layer 23, the lower layer 24 comprising water and solids. The separated liquefied gas 23 is recycled to the freezer 1 via line 13. The water and sludge solids are pumped to sedimentation tank 4 where the solids settle out and are discharged via line 19. The supernatant liquid 25 is then passed via line 16 to the stripper 5 where the last traces of liquefied gas are removed using an inert gas, such as nitrogen, supplied via line 17. If a vacuum stripper is used, the gas evolved can be collected and re-used in the process of the invention.

It is to be understood that the scheme illustrated and described is merely one example of how the method of the invention can be practised. Many variations are possible, and the particular positions of the supply lines indicated are merely illustrative.

It is generally preferred that the contents of the freezer 1 and/or of the melter 2 be agitated since this improves the efficiency of the freezing and/or melting steps.

In operating a batch-wise process, it is possible to carry out two or more of the freezing, melting, decanting and sedimentation steps sequentially in a single vessel.

In order that the invention may be more fully understood, the following example is given by way of illustration only.

Example

Waterworks sludges of both alum and iron coagulant types were sprayed in droplet form into the vapour space above liquid commercial butane, in a batch process. On entering the liquid butane, the droplets quickly froze. The liquid butane was agitated by introduction of nitrogen, and freezing occurred at temperatures from −16°C. to 0°C.

After freezing of the droplets they were separated from the liquid butane and allowed to thaw by exposure to ambient temperature and pressure.

The specific resistant ($r$) of the sludges was determined before and after the freezing treatment, and the results are shown in the Table:

TABLE

| Type of sludge | r before freezing | r after freezing | r before/r after |
| --- | --- | --- | --- |
| Alum | $6.25 \times 10^8$ | $0.069 \times 10^8$ | 90 |
| Alum | $9.5 \times 10^8$ | $0.058 \times 10^8$ | 160 |
| Iron | $16.2 \times 10^8$ | $0.116 \times 10^8$ | 140 |
| Iron | $23 \times 10^8$ | $0.113 \times 10^8$ | 200 |

It will be seen that the treatment of the invention reduced the specific resistance filtration by a factor of 90 to 200, and this is a very large reduction indeed. For the avoidance of my misunderstanding, the specific resistance, $r$, is given by:

$$r = (2bPA^2)/(xc)$$

where $P$ is the applied pressure (g/cm$^2$)

$A$ is the filter area (cm²)
$x$ is the filtrate viscosity (poise)
$c$ is the solid concentration in the sludge (g/cm³)
$b$ is the slope of the line obtained when $t/V$ is plotted against $V$, where $t$ is the time in seconds for a volume of sludge $V$ to be filtered.

(see J. D. Swanwick and M. F. Davidson — Water and Waste Treatment Journal — July/August 1961, page 386)

I claim:

1. A method of reducing the liquid content of a sludge which comprises freezing the sludge in droplet form, by contacting it with an inert liquid which is at a temperature below the freezing temperature of the suspending medium of the sludge and which is immiscible with the said medium, thawing the frozen sludge droplets and then reducing the liquid content of the thawed sludge.

2. A method according to claim 1 wherein preformed droplets of sludge are passed into a bath of the inert liquid.

3. A method according to claim 1 wherein the inert liquid is agitated during the freezing of the droplets.

4. A method according to claim 1 wherein the inert liquid is a liquefied gas.

5. A method according to claim 4 wherein the at least part of the latent heat of freezing of the sludge droplets is absorbed as latent heat of evaporation of the liquefied gas and wherein at least part of the evaporated gas is used subsequently to thaw the frozen sludge droplets.

6. A method according to claim 4 wherein the gas is selected from the group consisting of n- and iso-butane, propane, butene and mixtures thereof.

7. In a method of dewatering an aqueous sludge, which comprises freezing the sludge, thawing it and then dewatering it, the improvement which comprises forming discrete droplets of the sludge and freezing the individual droplets by contacting them with an inert water-immiscible liquid which is at a temperature below 32°F.

8. A method according to claim 7 wherein the inert water-immiscible liquid is a liquefied gas which boils at a temperature below 32+F at a pressure of from 10 to 30 p.s.i.a. and wherein the liquefied gas is maintained at said pressure and at least part of the latent heat of freezing the sludge droplets is absorbed as latent heat of boiling of the said gas.

9. A method according to claim 7 wherein the gas evolved during the freezing is subsequently used to thaw the frozen droplets.

10. A method according to claim 3 wherein the sludge droplets in the inert liquid are in the form of a fluidised bed.

11. A method according to claim 7 wherein the sludge droplets in the inert liquid are in the form of a fluidised bed.

* * * * *